United States Patent
Chiu et al.

(10) Patent No.: US 10,320,814 B2
(45) Date of Patent: Jun. 11, 2019

(54) DETECTION OF ADVANCED PERSISTENT THREAT ATTACK ON A PRIVATE COMPUTER NETWORK

(71) Applicant: Trend Micro Incorporated, Tokyo (JP)

(72) Inventors: Li-Hsiang Chiu, Taipei (TW);
Wei-Ching Chang, Taipei (TW);
Shih-Hao Weng, Taipei (TW)

(73) Assignee: TREND MICRO INCORPORATED, Tokyo (JP)

(*) Notice: Subject to any disclaimer, the term of this patent is extended or adjusted under 35 U.S.C. 154(b) by 418 days.

(21) Appl. No.: 14/873,627

(22) Filed: Oct. 2, 2015

(65) Prior Publication Data
US 2017/0099306 A1    Apr. 6, 2017

(51) Int. Cl.
*H04L 29/06* (2006.01)

(52) U.S. Cl.
CPC ...... *H04L 63/1416* (2013.01); *H04L 63/1425* (2013.01); *H04L 63/1441* (2013.01)

(58) Field of Classification Search
CPC ............ H04L 63/1441; H04L 63/1416; H04L 63/1425; H04L 63/1408
See application file for complete search history.

(56) References Cited

U.S. PATENT DOCUMENTS

| | | | |
|---|---|---|---|
| 6,202,158 B1 * | 3/2001 | Urano | G06F 21/316 726/22 |
| 8,069,372 B2 | 11/2011 | Natvig | |
| 9,111,088 B2 * | 8/2015 | Ghai | G06F 21/55 |
| 9,185,095 B1 * | 11/2015 | Moritz | H04L 63/102 |
| 2004/0044912 A1 * | 3/2004 | Connary | H04L 43/045 726/23 |
| 2006/0064598 A1 * | 3/2006 | Higashikado | H04L 63/0263 713/182 |
| 2007/0039049 A1 * | 2/2007 | Kupferman | G06F 11/3495 726/22 |
| 2007/0118350 A1 | 5/2007 | van der Made | |
| 2011/0238855 A1 * | 9/2011 | Korsunsky | G06F 21/55 709/231 |
| 2013/0117006 A1 | 5/2013 | Varghese et al. | |
| 2013/0117848 A1 | 5/2013 | Golshan et al. | |

(Continued)

OTHER PUBLICATIONS

Http://searchsecurity.techtarget.com/definition/advanced-persistent-threat-ADT, Nov. 2010. pp. 1-4.*

(Continued)

*Primary Examiner* — Kambiz Zand
*Assistant Examiner* — Tongoc Tran
(74) *Attorney, Agent, or Firm* — Okamoto & Benedicto LLP

(57) ABSTRACT

A system for detecting an advanced persistent threat (APT) attack on a private computer network includes hosts computers that receive network traffic and process the network traffic to identify an access event that indicates access to a critical asset of an organization that owns or maintains the private computer network. The critical asset may be a computer that stores confidential data of the organization. Access events may be stored in an event log as event data. Access events indicated in the event log may be correlated using a set of alert rules to identify an APT attack.

17 Claims, 8 Drawing Sheets

(56) References Cited

U.S. PATENT DOCUMENTS

2014/0298461 A1* 10/2014 Hohndel ............. H04L 63/1416
　　　　　　　　　　　　　　　　　　　　　　　　726/23
2015/0033227 A1　　1/2015 Lin et al.

OTHER PUBLICATIONS

Sandboxie—Wikipedia, the free encyclopedia, 2 sheets [retrieved on Jul. 2, 2013], retrieved from the internet: http://en.wikipedia.org/wiki/Sandboxie.

Sandboxie—Sandbox software for application isolation and secure Web browsing, 3 sheets [retrieved on Jul. 17, 2013], retrieved from the internet: http://www.sandboxie.com/.

Advanced persistent threat—Wikipedia, the free encyclopedia, 4 sheets [retrieved on Jul. 17, 2013], retrieved from the internet: http://en.wikipedia.org/wiki//Advanced_persistent_threat.

VMware VMotion Live migration of virtual machines without service interuption, 2 sheets, webpage [online][retrieved on Jun. 3, 2009], retrieved from the internet: http://www.vmware.com/files/pdf/vmotion_datasheet.pdf.

Interop Labs What is Cisco NAC?, 2 sheets, [retrieved on Jun. 3, 2009], retrieved from the internet: http://www.interop.com/archive/pdfs/2007-06WhatIsCiscoNAC.pdf.

VMware VSphere Live migration of virtual machines, 2 sheets, webpage [online][retrieved on Jun. 3, 2009], retrieved from the internet: http://www.vmware.com/products/vi/vc/vmotion.html.

Cisco Systems—Cisco Network Admission Control (NAC), 2 sheets, webpage [online][retrieved on Jun. 3, 2009], retrieved from the internet: http://www.cisco.com/en/US/netsol/ns466/networking_solutions_package.html.

Cisco NAC Appliance—Wikipedia, the free encyclopedia, 5 sheets [retrieved on Jun. 3, 2009], retrieved from the internet: http://en.wikipedia.org/wiki/Clean_Access_Agent.

Microsoft About NAP (Windows), 1 sheet, webpage [online][retrieved on Jun. 3, 2009], retrieved from the internet: http://msdn.microsoft.co/en-us/library/aa369143(VS.85).aspx.

Java virtual machine—Wikipedia, the free encyclopedia, 8 sheets [retrieved on Jan. 6, 2012], retrieved from the internet: http://en.wikipedia.org/wiki/Java_virtual_machine.

Java.security Class AllPermission (Java 2 Platform SE v1.4.2), 5 sheets [retrieved on Jan. 6, 2012], retrieved from the internet: http://docs.oracle.com/javase/1.4.2./docs/api/java/security/AllPermission.html.

Qin Li, et al. "HyperMIP: Hypervisor controlled Mobile IP for Virtual Machine Live Migration across Networks", 2008, pp. 80-88, 11th IEEE High Assurance Systems Engineering Symposium.

Koichi Onoue, et al. "A Virtual Machine Migration System Based on a CPU Emulator", 2006, pp. 1-8, IEEE 2nd International Workshop on Virtualization Technology in Distributed Computing (VTDC 2006).

* cited by examiner

| detectionType: 1 | deviceDirection: outbound | deviceGUID: 540C7CA200BF-4550B0D1-EFCC-6D32-88A7 | deviceMacAddress: 00:24:E8:50:CA:18 | deviceRiskConfidenceLevel: 3 | dhost: 3503-rpc03 | dmac: 2C:41:38:AC:B5:93 | dpt: 445 | dst: 10.235.3.4 | dstGroup: Default | dstZone: 1 | dvc: 10.21.1.200 | dvchost: DDI35 | eventId: 100119 | eventName: SECURITY_RISK_DETECTION | fileName: atsvc | hostName: 0708-RPC03 | hostName_aptKb: No | hostSeverity: 1 | interested Group: Default | interestedHost: 0708-rpc03 | interestedIp: 10.207.8.74 | malType: OTHERS | pAttackPhase: Lateral Movement | pComp:NCIE | peerGroup: Default | peerHost: 3503-rpc03 | peerIp: 10.235.3.4 | pname: Deep Discovery Inspector | potential Risk: 1 | pver: 3.7.1096 | remarks: ["Domain: 0708-RPC03"] | rtDate: 2015-07-24 | rtHour: 10 | rtWeekDay:Friday | ruleId: 1731 | ruleName:Remote Add Job through SMB2 Protocol Detected | severity: 2 | shost: 0708-rpc03 | smac: 2C:41:38:AA:E8:58 | spt: 65199 | src: 10.207.8.74 | srcGroup: Default | srcZone: 1 | suid: hp6200p | tag: last 30 days.zip | threatType: 2 | vendor: Trend Micro | vLANId: 4095 rt: 2015-07-24T10:20:15+08:00 | act: not blocked | app: SMB | appGroup: CIFS | botCmd: c:\users\hp6200p\appdata\local\temp\tasksvr.exe | detectionType: 1 | deviceDirection: outbound | deviceGUID: 540C7CA200BF-4550B001-EFCC-6D32-88A7 | deviceMacAddress: 00:24:E8:5D:CA:1B | deviceRiskConfidenceLevel: 3 | dhost: 3503-rpc03 | dmac: 2C:41:38:AC:B5:93 | dpt: 445 | dstGroup: Default | dstZone: 1 | dvc: 10.21.1.200 | dvchost: DDI35 | eventId: 100119 | dst: 10.235.3.4 | eventName: SECURITY_RISK_DETECTION | fileName: atsvc | hostName: 0708-RPC03 | hostName_aptKb: No | hostSeverity: 1 | interestedGroup: Default | interestedHost: 0708-rpc03 | interestedIp: 10.207.8.74 | peerIp: 10.235.3.4 | malType: OTHERS | pAttackPhase: Lateral Movement | pComp: Default | peerGroup: Default | peerHost: 3503-rpc03 | pname: DeepDiscovery Inspector | potentialRisk: 1 | pver: 3.7.1096 | remarks: ["Domain: 0708-RPC03"] | rtDate: 2015-07-24 | rtHour: 10 | rtWeekDay: Friday | ruleId: 1731 | ruleName: Remote Add Job through SMB2 Protocol Detected | severity: 2 | shost: 0708-rpc03 | smac: 2C:41:38:AA:E8:58 | spt: 62618 | src: 10.207.8.74 | srcGroup: Default | srcZone: 1 | suid: hp6200p | tag: last 30 days.zip | threatType: 2 | v

*FIG. 5* rt: 2015-07-23T15:32:24+08:00 | act: not blocked | app: SMB | appGroup: CIFS | botCMD: c:\windows\system32\config\regback.exe 186.232.87.226.443 | detectionType:1 | deviceDirection: outbound | deviceGUID: 540C7CA200BF-4550B0D1-EFCC-6D32-88A7 | deviceMacAddress: 00:24:E8:50:CA:1B | deviceRiskConfidenceLevel: 3 | dhost: 1001-rpc01 | dmac: 2C:41:38:AA:E7:13 | dpt: 445 | dst: 10.210.1.1 | dstGroup: Default | dstZone: 1 | dvc: 10.21.1.200 | dvchost:DDI35 | eventId: 100119 | eventName: SECURITY_RISK_DETECTION | fileName: atsvc | hostName: 3203-RPC02 | hostName_aptKb: No | hostSeverity: 1 | interestedGroup: Default | interestedHost: 3203-rpc02 | interest edIp: 10.232.3.1 | malType: OTHERS | pAttackPhase: Lateral Movement | pComp: NCIE | peerGroup: Default | peerHost: 1001-rpc01 | peerIp: 10.210.1.1 | pname: DeepDiscovery Inspector | potentialRisk: 1 | pver: 3.7.1096 | remarks: ["Domain: 3203-RPC02"] | rtDate: 2015-07-23 | rtHour: 15 | rtWeekDay: Thursday | ruleId: 1731 | ruleName: Remote Add Job through SMB2 Protocol Detected | severity:2 | shost: 3203-rpc02 | smac: 2C:41:38:A4:BE:CE | spt: 57396 | src: 10.232.3.1 | srcGroup: Default | srcZone: 1 | suid: HP6200P | tag: last 30 days.zip | threatType: 2 | ve vLANId: 4095 rt: 2015-07-23T15:31:28+08:00 | act: not blocked | app: SMB2 | appGroup: CIFS | detectionType: 0 | deviceDirection: outbound | deviceGUID: 540C7CA200BF-4550B0D1-EFCC-6D32-88A7 | deviceMacAddress: 00:24:E8:5D:CA:1B | deviceRiskConfidenceL evel: 0 | dhost: 1001-rpc01 | dmac: 2C:41:38:AA:E7:13 | dpt: 445 | dst:10.210.1.1 | dstGroup: Default | dstZone: 1 | dvc: 10.21.1.200 | dvchost:DDI35 | eventId: 100100 | eventName: MALWARE_DETECTION | fileHash: F11BA04C217AD472A10E9B75D2D56DEB6F910971 | fileHash_aptKb: No | fileHash_gridRating: Unknown | fileName: regback.exe | filePath: c$\windows\system32\config\ | fileSize: 169984 | fileType: EXE | heurFlag: 0 | hostName: 3203-RPC02 | ho stName_aptKb: No | hostSeverity: 8 | interestedGroup: Default | interestedHost: 3203-rpc02 | interestedIp: 10.232.3.1 | malName: TROJ_SMALL.CPE | malType: Trojan | pComp: VSAPI | peerGroup: Default | peerHost: 1001-rpc01 | peerIp: 10.210.1.1 | pname: Deep Discovery Inspector | potentialRisk: 0 | pver: 3.7.1096 | remarks: ["Malware: TROJ_SMALL.CPE"] | rtDate: 2015-07-23 | rtHour: 15 | rtWeekDay: Thursday | ruleId: 0 | ruleName: Monitored host is propagating malware. | severity: 8 | shost: 3203-rpc02 | smac: 2C:41:38:A4:BE:CE | spt: 57396 | sr c: 10.232.3.1 | srcGroup:Default | srcZone: 1 | suid: HP6200P | tag: last 30 days.zip | threatType: 0 | vendor: Trend Micro | vLANId: 4095

FIG. 6 rt: 2015-07-24T10:48:53+08:00 | authenticationPackage: NTLM | domainName:03 | endpointGUID: 675e7af3-3e0c-49e7-a6e1-d6195b10088d | hostName: 3503-RPC03 | eventClass: α | eventId: 200103 | eventName: SYSTEM_ACTIVITY | hostName: 3503-RPC03 | interestedDomain: 503 | interestedHost: 3503-RPC03 | interestedIp: 10.235.3.4 | logonType: 3 | osName:Windows 7 | osVer: NT 6.1 | pComp: Microsoft-Windows-Security-Auditing | peerDom ain: 3503-RPC03 | peerHost:0708-RPC03 | peerIp: 10.207.8.74 | peerUser: HP6200P | pname: Trend Micro log Collection Tool | pver: 1.0.1031 | remarks:

| rtDate: 2015-07-24 | rtHour: 10 | rtWeekDay: Friday | ruleId: 4624 | ruleName:账户成功登入 | senderGUID: 675e7af3-3e0c-49e7-a6e1-d6195b10088d | senderIp: 10.235.3.4 | tag: win_event_log | means successful login rt: 2015-07-24T10:14:52+08:00 | authenticationPackage: NTLM | domainName: 03 | endpointGUID: 675e7af3-3e0c-49e7-a6e1-d6195b10088d | endpointIp:10.235.3.4 | eventClass: α | eventId: 200103 | eventName: SYSTEM_ACTIVITY | hostName: 3503-RPC03 | interestedDomain: 503 | interestedHost: 3503-RPC03 | interestedIp: 10.235.3.4 | logonType: 3 | osName:Windows 7 | osVer: NT 6.1 | pComp: Microsoft-Windows-Security-Auditing | peerDom ain: 3503-RPC03 | peerHost:0708-RPC03 | peerIp: 10.207.8.74 | peerUser: HP6200P | pname: Trend Micro log Collection Tool | pver: 1.0.1031 | remarks:

| rtDate: 2015-07-24 | rtHour: 10 | rtWeekDay: Friday | ruleId: 4624 | ruleName:账户成功登入 | senderGUID:

FIG. 7

```
rule ad_auth_logon_success {
    meta:
        description = "frequent success from different machine - High"
    filter:
        ((EventCode == "4768" or EventCode == "672") and (Result_Code == "0x0" or Result_Code == "-"))
    aggregate:
        group_by = (Account_Name, Client_Address)
        time_window = 10800
        $machine_count = count(Client_Address)
    trigger:
        $machine_count >= 5
}
```

FIG. 8

DETECTION OF ADVANCED PERSISTENT THREAT ATTACK ON A PRIVATE COMPUTER NETWORK

BACKGROUND OF THE INVENTION

1. Field of the Invention

The present invention relates generally to computer security, and more particularly but not exclusively to methods and apparatus for detecting advanced persistent threats.

2. Description of the Background Art

Advanced persistent threat (APT) is a type of cyber attack that is tailored to a particular target, which is typically an organization, such as a business or government. Compared to mass attacks, an APT attack is very sophisticated and typically includes several stages. First, the attacker performs information gathering on the target. From the gathered information, the attacker identifies a vulnerability to gain entry into the target's computer network and create a back door that allows communication with an APT command and control server. The attacker then roams the network to obtain higher level permissions (e.g., passwords to critical assets) and to find confidential data, such as intellectual property data, financial data, personally identifiable information, etc. The attacker transfers the confidential data out of the target's computer network and may even cover his tracks, such as by deleting programs used to perpetrate the APT attack.

SUMMARY

In one embodiment, a system for detecting an advanced persistent threat (APT) attack on a private computer network includes hosts computers that receive network traffic and process the network traffic to identify an access event that indicates access to a critical asset of an organization that owns or maintains the private computer network. The critical asset may be a computer that stores confidential data of the organization. Access events may be stored in an event log as event data. Access events indicated in the event log may be correlated using a set of alert rules to identify an APT attack.

These and other features of the present invention will be readily apparent to persons of ordinary skill in the art upon reading the entirety of this disclosure, which includes the accompanying drawings and claims.

DESCRIPTION OF THE DRAWINGS

FIGS. 5-7 show example event data that may be logged and transmitted by a network sensor, in accordance with an embodiment of the present invention.

FIG. 8 shows an example pseudo code for a rule that may be used by a correlator to detect successful logins that may indicate lateral movement of an APT attack, in accordance with an embodiment of the present invention.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The inventors believe that traditional solutions for detecting network intrusions and malware (e.g., computer viruses, Trojans, worms) are ineffective against APT attacks because an APT attack typically involves activities that at a glance appear to be normal. As a particular example, an APT attack may be initiated by sending a so-called "spear fishing email" that targets low-level personnel who have access to the network. The spear phishing email may allow the attacker, i.e., cybercriminal or software perpetrating the APT attack, only limited access to the network using the credentials of low-level personnel. However, once on the network, the attacker may roam the network to find credentials of higher-level personnel and discover network paths to other computers on the network. This stage of the APT attack is also referred to as "lateral movement" and is relatively difficult to detect because the corresponding network activity of the attacker appears to be normal or authorized. The following stage of the APT attack where the attacker looks for sensitive data, which is referred to as "data discovery", is also relatively difficult to detect for the same reason.

Figure 1:
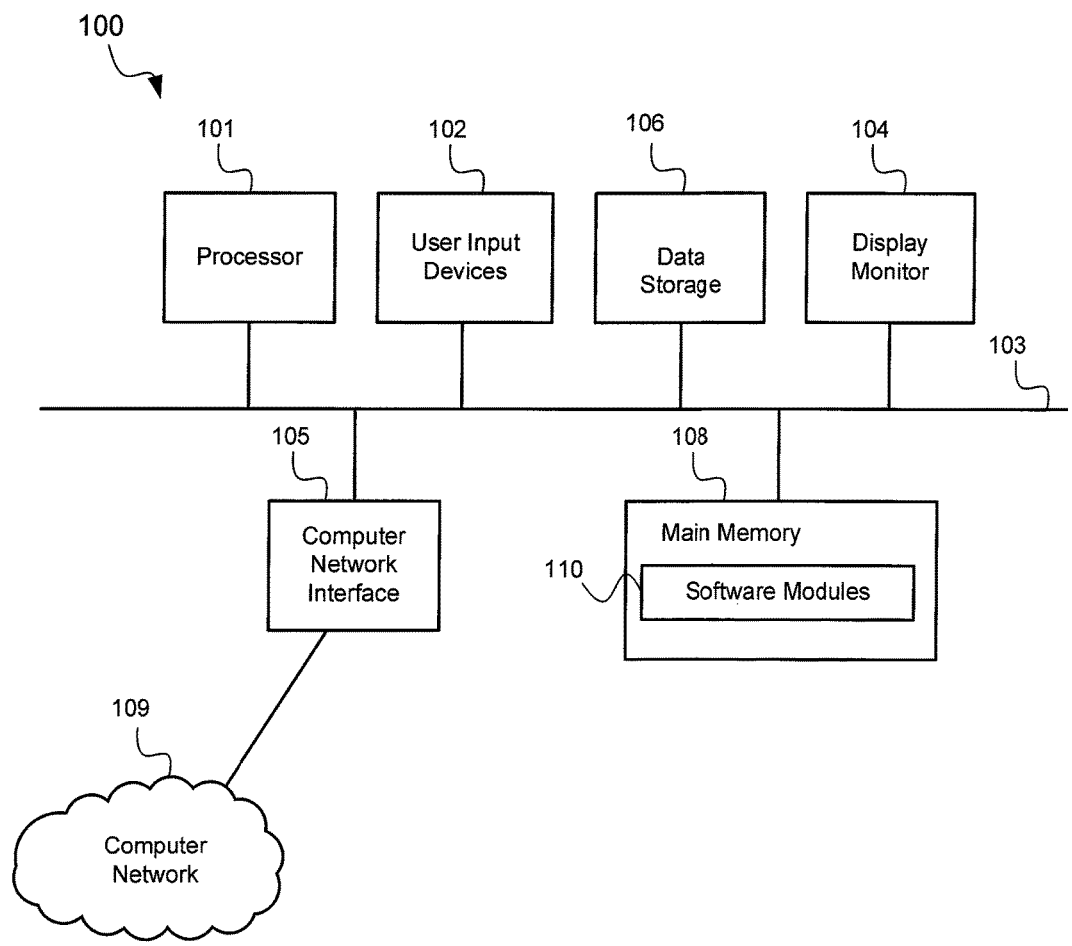
FIG. 1 shows a block diagram of a computer that may be employed with embodiments of the present invention.

Referring now to FIG. 1, there is shown a block diagram of a computer 100 that may be employed with embodiments of the present invention. The computer 100 may be employed as a server computer, a client computer, and other computers described below. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise software modules for detecting an APT attack when the computer 100 is employed as an APT detection server.

The computer 100 may be configured to perform its functions by executing the software modules 110. The software modules 110 may be loaded from the data storage device 106 to the main memory 108. An article of manufacture may be embodied as computer-readable storage medium including instructions that when executed by the computer 100 causes the computer 100 to be operable to perform the functions of the software modules 110.

Figure 2:
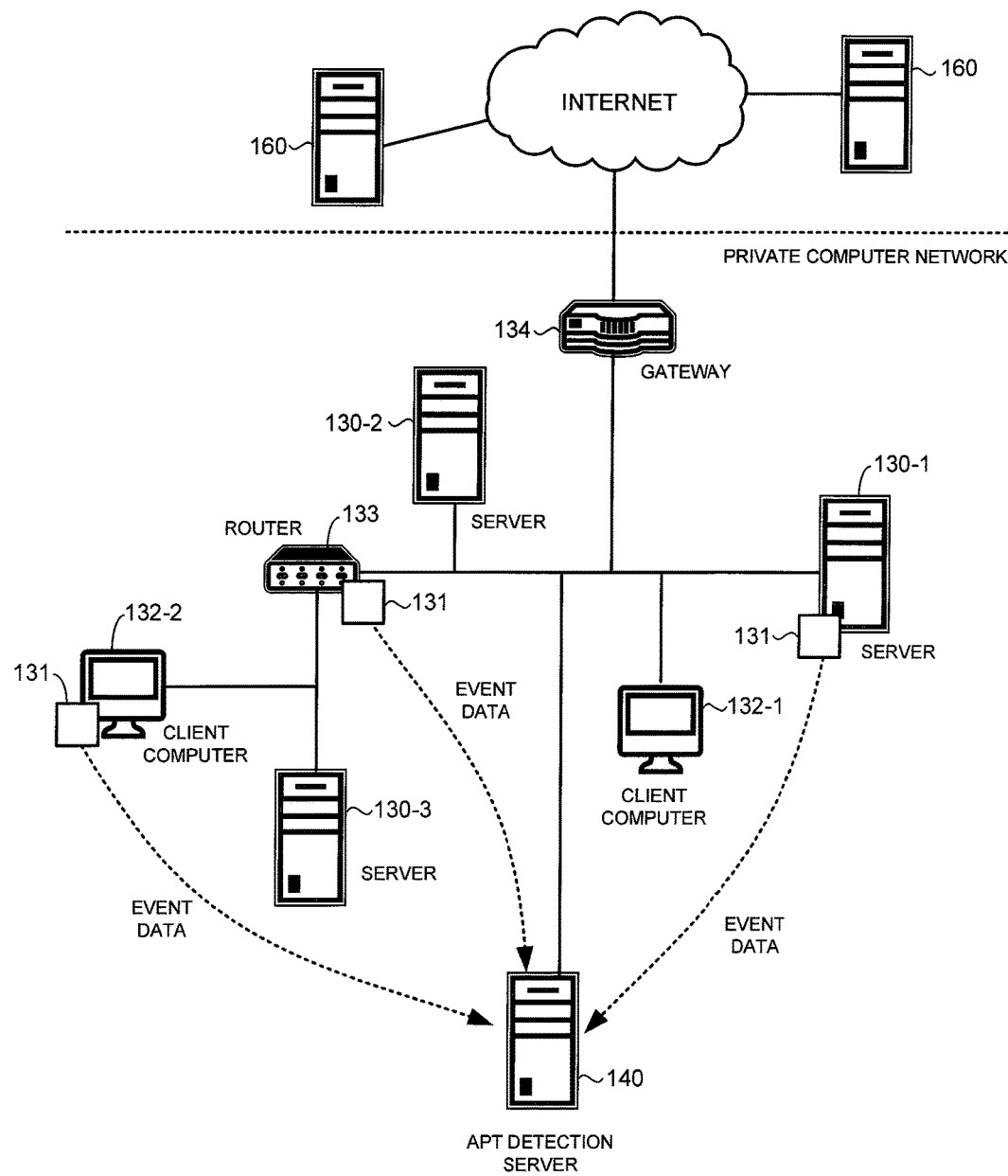
FIGS. 2 and 3 show block diagrams of a system for detecting an APT attack on a private computer network in accordance with embodiments of the present invention.

FIG. 2 shows a block diagram of a system for detecting an APT attack on a private computer network in accordance with an embodiment of the present invention. In the example of FIG. 2, the system is deployed in a private computer network, such as that of a large or small organization. For example, the private computer network may be an enterprise network of a small business, large corporation, or a government. In the example of FIG. 2, the private computer network comprises one or more servers 130 (i.e., 130-1, 130-2, 130-3, etc.), one or more client computers 132 (i.e., 132-1, 132-2, etc.), a router 133, and a gateway 134. As can be appreciated, a server may comprise one or more computers, and a client computer may comprise a personal computer of a user. A personal computer may comprise a desktop computer, a laptop computer, a tablet, or other user computer. The private computer network may include fewer or more computer devices depending on the size of the network.

In the example of FIG. 2, a gateway 134 comprises a computer that provides gateway/firewall functionality for the private computer network. In one embodiment, data that are transferred between computers on the private computer network and computers on the Internet (e.g., computers 160) go through the gateway 134. The gateway 134 may include conventional computer security modules, including an antivirus program, an antispam program, etc. However, as previously noted, conventional computer security modules are largely ineffective against APT attacks.

In the example of FIG. 2, the system for detecting an APT attack on the private computer network comprises an APT detection server 140 and one or more computers that host a network sensor 131. In the example of FIG. 2, a network sensor 131 may comprise computer-readable program code that is hosted (i.e., running) on a server 130, a client computer 132, a router 133, or other computer device on the private computer network.

In one embodiment, a network sensor 131 is configured to receive network traffic, parse the network traffic for event data that indicates access events involving critical assets, and forward the event data to the APT detection server 140. The critical assets may comprise computers that store confidential data, such as servers that contain intellectual property data and personal computers of high-level personnel (e.g., president, network administrator, chief technical officer). For example, a network sensor 131 may receive network packets and parse the network packets to identify network packets having destination and/or origin (i.e., sending) addresses of critical assets. The network sensor 131 may forward to the APT detection server 140 the identified network packets along with other related information, such as timestamps, routing information, etc., as event data. In one embodiment, the network sensor 131 may provide the event data in a format that may be readily stored in and read from an event log.

Figure 3:
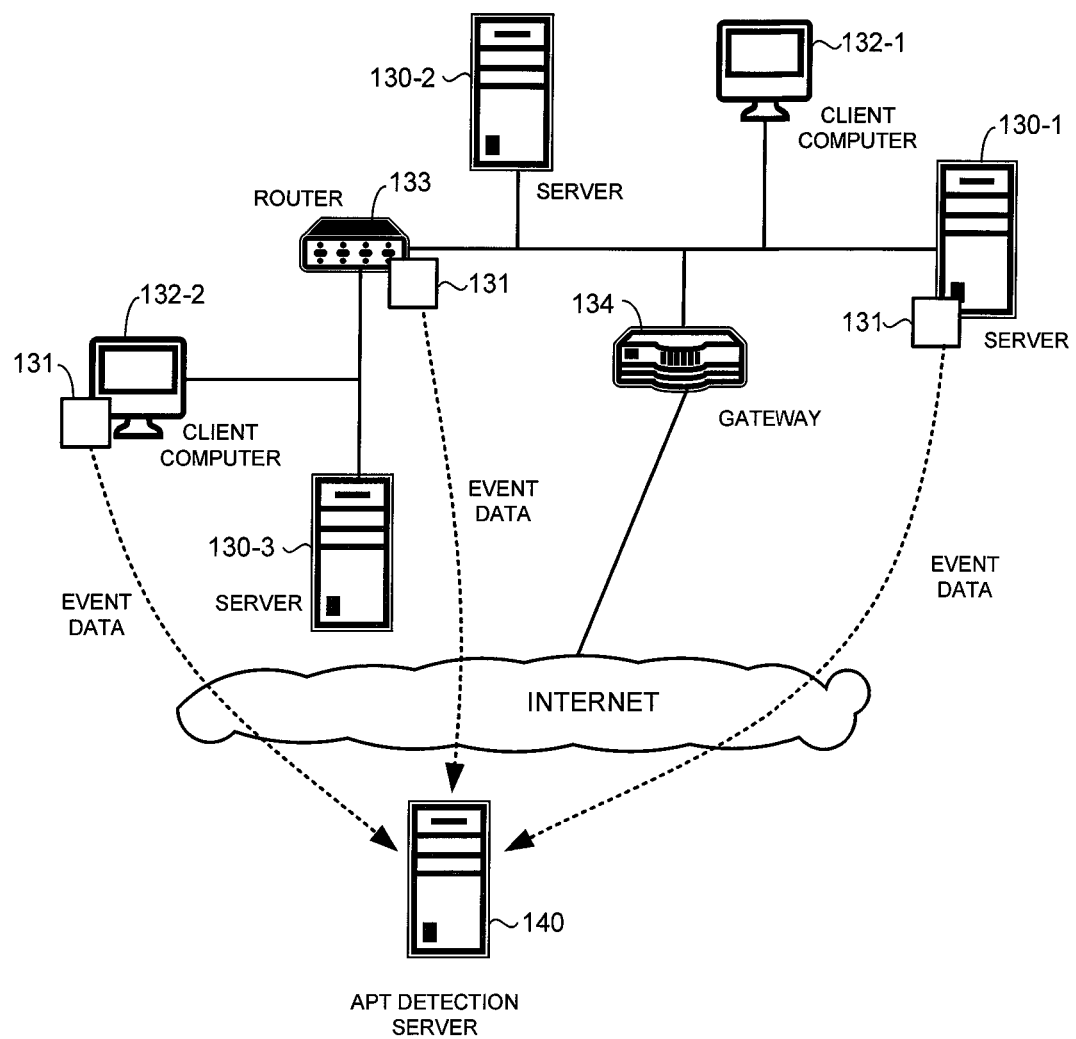

In one embodiment, the APT detection server 140 comprises one or more computers that receive event data from network sensors 131, process the event data to adjust a set of alert rules, and to correlate the event data using the set of alert rules to identify an APT attack. In the example of FIG. 2, the APT detection server 140 is deployed on-premise within the private computer network. The APT detection server 140 may also be deployed outside the private computer network. For example, as shown in FIG. 3, the APT detection server 140 may be deployed on the Internet. In that case, the sensors 131 may provide event data to the APT detection server 140 over the Internet. FIGS. 2 and 3 show the same network except for the location of the APT detection server 140.

Figure 4:
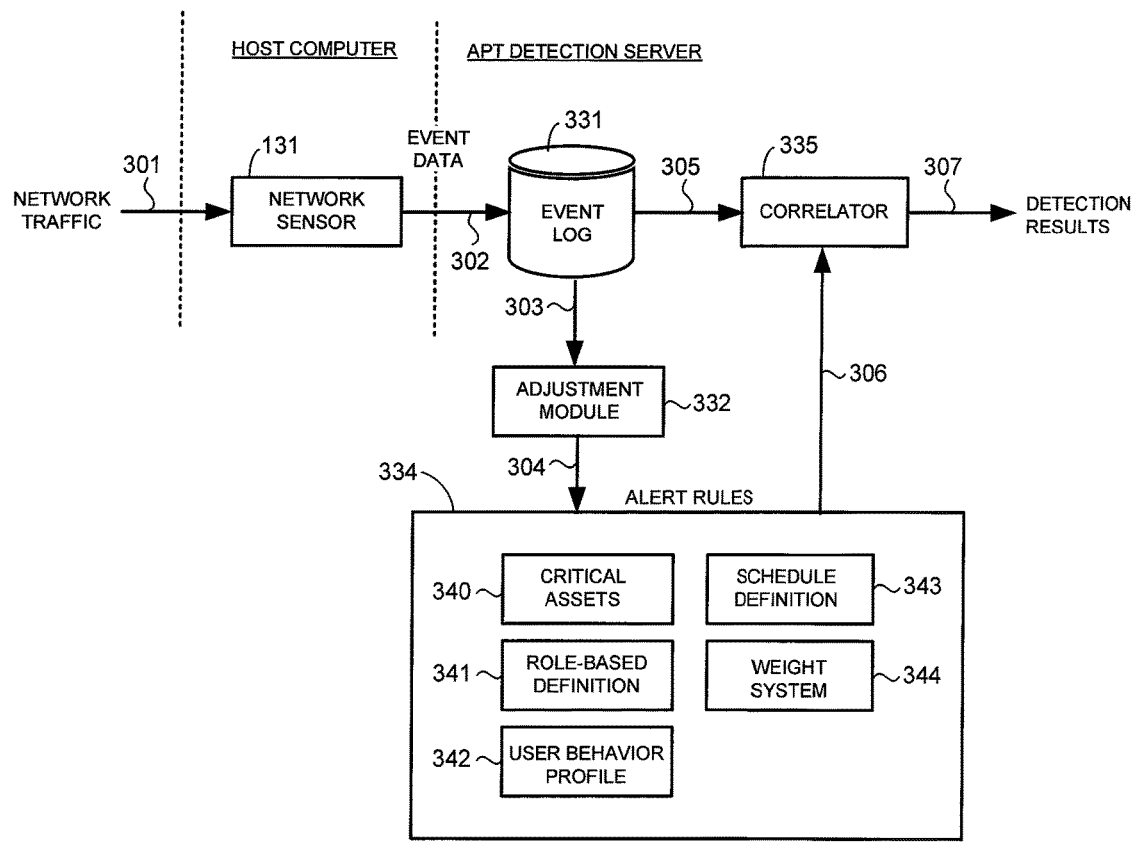
FIG. 4 shows a flow diagram of a method of detecting an APT attack on a private computer network in accordance with an embodiment of the present invention.

FIG. 4 shows a flow diagram of a method of detecting an APT attack on a private computer network in accordance with an embodiment of the present invention. The flow diagram of FIG. 4 is explained using the components of the systems of FIGS. 2 and 3.

In the example of FIG. 4, a network sensor 131 is hosted by a computer, such as a client computer 132, a server 130, a router 133 or other computer on the private computer network. Only one network sensor 131 is shown in FIG. 4 for clarity of illustration. It is to be noted that in a typical deployment, there is a plurality of network sensors 131 on the private computer network.

In the example of FIG. 4, the network sensor 131 monitors and receives network traffic on the private computer network (see arrow 301) and processes the network traffic to identify events involving access to critical assets on the private computer network. The network sensor 131 may communicate with remote services, such as a web reputation service, file reputation service, etc. to add additional information to data obtained from received network traffic.

The network sensor 131 may be running on a file server computer that is designated as a critical asset. In that example, the network sensor 131 may monitor and record access to the file server computer. As another example, the network sensor 131 may be running on a router 133; in that case the network sensor 131 may parse network packets passing through the router 133 to identify events involving access to critical assets. The network sensor 131 may format identified events into event data, which the network sensor 131 transmits to the APT detection server 140 (see arrow 302).

FIGS. 5-7 show example event data that may be logged and transmitted by the network sensor 131. In the example of FIG. 5, the event data indicate, among other information, a file ("fileName") transmitted by a sending host ("shost") to a destination host ("dhost"), the MAC addresses of the destination ("dmac") and sending ("smac") hosts, and unique ID of the sending host ("suid"). In particular, the even data indicate an event involving a sending host that is identified as "HP6200P" ("suid: HP6200P"). In the example of FIG. 6, the event data identify the same sending host ("suid: HP6200P") as sending malware ("malName: TROJ_SMALL.CPE"). In the example of FIG. 7, the event data identify a successful login by a sending host with an IP address of 10.235.3.4 ("endpointIP), which is the same as that involved with the sending host identified in the event data shown in FIGS. 5 and 6. The examples of FIGS. 5-7 illustrate example data that may be collected by a network sensor 131. The data to be collected and monitored may be varied depending on the particulars of the APT detection system being implemented.

Continuing with FIG. 4, the APT detection server 140 may be deployed on-premise within the private computer network, in which case the network sensor 131 transmits the event data to the APT detection server 140 over the private computer network. In other embodiments, the network sensor 131 transmits the event data to an APT detection server 140 that is deployed "in the cloud", i.e., on the Internet. In that case, the network sensor 131 transmits the event data to the APT detection server 140 over the Internet through the gateway 134.

In one embodiment, the APT detection server 140 comprises an event log 331, an adjustment module 332, a set of alert rules 334, and a correlator 335. In the example of FIG. 4, the APT detection server 140 receives and stores event data in an event log 331 (see arrow 302). The event log 331 may comprise a database or other listing of event data.

In one embodiment, the adjustment module 332 comprises one or more software- or hardware-based tools for reading, viewing, and extracting parameter data for one or more rules of the set of alert rules 334. The adjustment module 332 may be employed by antivirus researchers or programs (e.g., scripts) to extract from the event log 331 data that may be used to define parameters for the set of alert rules 334, such as data that identify critical assets, the roles of users of the critical assets, the behavior of users of the critical assets, and when the critical assets are accessed.

In one embodiment, the set of alert rules 334 comprises one or more rules for identifying an APT attack. In the example of FIG. 4, the set of alert rules 334 may comprise rules for identifying an anomalous access to a critical asset.

In the example of FIG. 4, the set of alert rules 334 comprises rules 340-344. The set of alert rules 334 may have fewer or additional rules depending on the particulars of the implementation. In the example of FIG. 4, the critical asset rules 340 identify the critical assets of the organization. Examples of critical assets include servers that are critical to the organization (e.g., servers that store marketing, research and development, or financial data) and personal computers of key personnel (e.g., laptop computers of the president, chief financial officer, etc.). The critical assets may be identified by their internet protocol (IP) address, media access control (MAC) address, host name, and/or fully qualified domain name, for example. Identifiers of the critical assets of the organization may be entered in the rules 340 by the system administrator or other authorized personnel, for example. The identifiers of critical assets indicated in the rules 340 may be provided to the network sensors 131 for monitoring purposes.

In the example of FIG. 4, the role-based definition rules 341 identify the authorized users of critical assets identified in the rules 340. Generally speaking, the rules 341 identify which computers should only be accessed by which users (e.g., from which account or which host/IP address). The users of critical assets may be authorized based on their roles in the organization. For example, computers that store financial data may only be accessed by the chief financial officer or managers of the finance department. An authorized user of a critical asset may be identified by his password/account name, host or IP address of his computer, or other information that uniquely and positively identify the authorized user. Identifiers of authorized users of critical assets of the organization may be entered in the rules 341 by the system administrator or other authorized personnel, for example.

In the example of FIG. 4, the user-behavior profile rules 342 indicate the access behavior profile of authorized users of critical assets. In one embodiment, the rules 342 indicate when a user typically accesses the critical asset (e.g., a user may typically access an asset on the first day of the month etc.), identify the computer typically employed by the user to access the asset (e.g., a user that typically accesses a server with a particular mobile device), and other access behavior of the user. The access behavior of the user may be identified from the event log 331.

In the example of FIG. 4, the schedule definition rules 343 indicate the time when the critical assets are normally accessed. Access to the critical assets outside their normal access times may be deemed to be abnormal. For example, a server that has been designated a critical asset may have an indicated normal access time in the rules 343 of between 00:00 hours and 05:00 hours Monday through Friday. Access to that server outside its normal access time (e.g., access to the server at 08:00 hours) may be deemed to be abnormal.

In the example of FIG. 4, the weight system rules 344 indicate assigned weights to particular access events. More particularly, different access events, such as continuous login failures, multiple logins at the same time, login from a different computer, etc. may be assigned different weights to indicate their relevance in detecting an APT attack. The weights may be employed by the correlator 335 to determine whether or not an anomalous access to a critical asset is an APT attack. The weights for particular access events may be entered in the rules 344 by the system administrator or other authorized personnel, for example.

Prior to normal operation wherein the system of FIG. 4 is employed to detect an APT attack, the system may first undergo an initial learning phase during which the system is operated to collect data for and make adjustments to the set of alert rules 334. More specifically, prior to normal operation, the system of FIG. 4 may be operated in an initial learning phase during which the network sensor 131 receives network traffic over the private computer network (see arrow 301), the network sensor 131 processes the received network traffic to generate and forward event data to the APT detection server 140 for storage in an event log 331 (see arrow 302), and the set of alert rules 334 are adjusted based on entries in the event log 331 (see arrows 303 and 304). During the initial learning phase, the set of alert rules 334 may be qualified, tuned, and adjusted by antivirus personnel for improved APT detection while minimizing false positives. After the initial learning phase, the system of FIG. 4 may be normally operated to detect an APT attack. As can be appreciated, the adjustment and tuning of the set of alert rules 334 may continue during normal operation to ensure that that the set of alert rules 334 are continually optimized for the private computer network.

During normal operation, the correlator 335 may be placed online to scan the event log 331 for entries indicating access to a critical asset (see arrow 305). The correlator 335 may consult the set of alert rules 334 to determine whether the access to the critical asset is normal or anomalous. For example, the correlator 335 may scan the event log 331 to identify event data indicating access to a critical asset (as per critical assets rules 340) outside its normal access time (as per schedule definition 343). The correlator 335 may base its decision on a particular event data or several event data. For example, in the just mentioned example, while access to a critical asset outside its normal access time may not be conclusive enough to declare the access to be an APT attack activity, that event coupled with another access event indicating that the same critical asset is accessed by an unauthorized user (per the role based definition rules 341) after several login failures (as per other event data in the event log 331) may indicate anomalous access to the critical asset.

FIG. 8 shows an example pseudo code for a rule that may be used by the correlator 335 to detect successful logins that may indicate lateral movement of an APT attack. In the example of FIG. 8, the rule looks for successful logins from different machines by the same user (identified by "Account_Name" and "Client_Address"). In the example of FIG. 8, successful logins from five or more computers ("$machine_count") within a predetermined time period ("time_window") indicates an anomalous access.

In one embodiment, the correlator 335 deems anomalous access to a critical asset to be a possible APT attack. In that case, the correlator 335 may alert an administrator or other authorized personnel about the anomalous access. The correlator 335 may send an alert by sending an email, displaying a message box, text messaging, raising an audible alarm, etc. The alert may be used to initiate an investigation of the anomalous access, raise security-levels (e.g., temporarily prevent access to critical assets) to prevent or minimize damage from an APT attack in progress, or initiate other responses for dealing with an APT attack.

Systems and methods for detecting an APT attack on a private computer network have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A system for detecting an advanced persistent threat (APT) attack on a private computer network of an organization, the system comprising:
    a plurality of hosts computers, the plurality of hosts computers receives network traffic over the private computer network, parses the network traffic to generate event data that indicate access to particular computers on the private computer network that store confidential data of the organization, and transmits the event data over the private computer network; and
    an APT detection server comprising one or more computers that receive the event data from the plurality of hosts computers, store the event data in an event log, and correlate data in the event log using a set of alert rules to detect an APT attack by identifying, from the event log, at least two anomalous accesses made by a same user or to a same computer among the particular computers.

2. The system of claim 1, wherein the set of alert rules comprises rules that identify the particular computers.

3. The system of claim 2, wherein the particular computers are identified by IP addresses.

4. The system of claim 1, wherein the set of alert rules comprises rules that indicate normal access times of the particular computers.

5. The system of claim 1, wherein the set of alert rules comprises rules that indicate authorized users of the particular computers.

6. The system of claim 5, wherein the set of alert rules comprises rules that indicate behavior profiles of the authorized users of the particular computers.

7. The system of claim 1, wherein the APT detection server is on-premise within the private computer network.

8. The system of claim 1, wherein the APT detection server receives the event data from the plurality of host computers over the Internet.

9. The system of claim 1, further comprising a gateway that receives the event data from the plurality of the host computers over the private computer network and forwards the event data to the APT detection server over the Internet.

10. A computer-implemented method of detecting an advanced persistent threat (APT) attack on a private computer network of an organization, the method comprising:
    receiving network traffic in hosts computers on the private computer network;
    the hosts computers parsing the network traffic to generate event data that indicate access to particular computers on the private computer network that store confidential data of the organization;
    the host computers transmitting the event data to an APT detection server that comprises one or more computers;
    the APT detection server receiving the event data from the host computers, storing the event data in an event log, correlating data in the event log using a set of alert rules, and detecting an APT attack by identifying, from the event log, at least two anomalous accesses made by a same user or to a same computer among the particular computers.

11. The method of claim 10, wherein the set of alert rules comprises rules that identify the particular computers.

12. The method of claim 11, wherein the particular computers are identified by IP addresses.

13. The method of claim 11, wherein the set of alert rules comprises rules that indicate normal access times of the particular computers.

14. The method of claim 11, wherein the set of alert rules comprises rules that indicate authorized users of the particular computers.

15. The method of claim 14, wherein the set of alert rules comprises rules that indicate behavior profiles of the authorized users of the particular computers.

16. The method of claim 11, wherein the APT detection server is on-premise within the private computer network and receives the event data from the hosts computers over the private computer network.

17. The method of claim 11, wherein the APT detection server receives the event data from the host computers over the Internet.

* * * * *